T. E. MURRAY.
METHOD OF MAKING SHEET METAL WHEELS.
APPLICATION FILED DEC. 14, 1916.
1,215,968.
Patented Feb. 13, 1917.
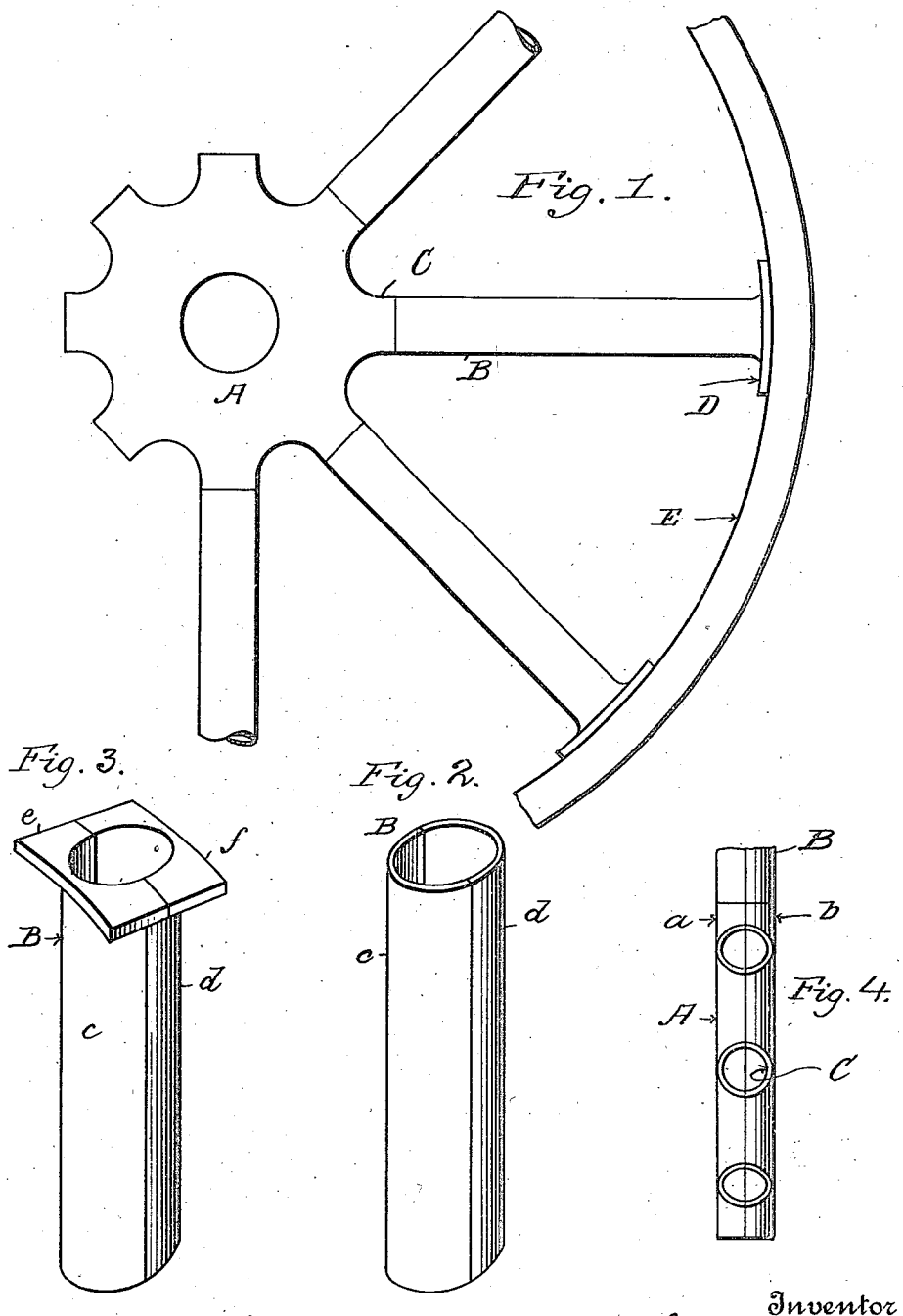

UNITED STATES PATENT OFFICE.

THOMAS E. MURRAY, OF NEW YORK, N. Y.

METHOD OF MAKING SHEET-METAL WHEELS.

1,215,968.　　　　　Specification of Letters Patent.　　Patented Feb. 13, 1917.

Application filed December 14, 1916.　Serial No. 136,858.

*To all whom it may concern:*

Be it known that I, THOMAS E. MURRAY, a citizen of the United States, residing at New York, in the county of New York and State of New York, have invented a certain new and useful Improvement in Methods of Making Sheet-Metal Wheels, of which the following is a specification.

My present invention is a method of making a wheel wholly of sheet metal, having its parts united by electrical welding, and, as steps in said method, a method of making the hub and a method of making the tubular spokes which enter into said wheel. In carrying out my method of making said wheel, I produce an indefinite number of similar half hub sections, and an indefinite number of similar half spoke sections, by striking up, stamping or pressing the sheet metal, and electrically weld any two sectional hub units to form the hub and pairs of any two sectional spoke units to form the spokes, and then electrically weld a suitable number of said spokes with said hub to form the completed wheel.

In the accompanying drawings—

Figure 1 is a portion of my wheel in elevation. Fig. 2 shows one of the spokes in perspective. Fig. 3 is a perspective view of one of the spokes, together with its end flange. Fig. 4 is an edge view of the hub, showing a portion of one of the attached spokes.

Similar letters of reference indicate like parts.

A is the hub formed in two half sections $a$, $b$, substantially dish-shaped and stamped from sheet metal and electrically welded at their meeting edges. B is a tubular spoke formed in longitudinal half sections $c$, $d$, electrically welded at their meeting edges. The inner ends of the spokes are electrically butt-welded to tubular projections C integrally formed on the hub A. The outer ends of the spokes may be electrically welded to flange plates D, also made in half sections $e$, $f$, electrically welded at their edges: or the plates D may be made in half sections, each half section being integral with a half section of a spoke. The several flange plates D are electrically welded to the inner periphery of the rim E.

By reason of this construction, I am enabled to make the hub and the spokes in sections, as described, by simple striking up, pressing or stamping processes. As the hub sections are exactly alike, they are interchangeable, and may be produced from the same dies, so that they can be made in large quantities cheaply and rapidly, and any two units thus made may be electrically welded together to form the hub. The same is true of the spoke sections whether the flange plates D be made integral with said sections or not.

It will be obvious that the wheel maker may provide himself with any desired number of hub sections and any desired number of spoke sections, with the certainty that all the hub section units will be exactly alike, and all the spoke section units will equally be exactly alike, and that as these units are none of them tubular or box-like, they can be stored in much less space than if the contrary were the case.

I claim:

1. The method of making a sheet metal vehicle wheel, comprising a rim, a hollow hub and tubular spokes, which consists in forming by striking up, pressing or stamping, a plurality of similar hub sections and a plurality of similar half spoke sections, electrically welding together any two sectional hub units to form the hub and pairs of any two sectional spoke units to form the spokes, and electrically welding said spokes to said hub and said rim.

2. The method of making a sheet metal wheel, which consists in producing (1) a sheet metal hub therefor by striking up, pressing or stamping two similar dish-shaped half hub sections, placing said sections concavity to concavity with their meeting edges registering, and electrically welding said edges together; (2) electrically butt-welding to the circumferential periphery of said hub a plurality of tubular sheet metal spokes; (3) electrically welding the outer ends of said spokes to the wheel rim.

3. The method of making a sheet metal wheel, which consists in producing (1) a sheet metal hub therefor by striking up, pressing or stamping two similar dish-shaped hub sections, placing said sections concavity to concavity with their meeting edges registering, and electrically welding said edges together; (2) sheet metal spokes by striking up, pressing or stamping for each spoke two similar semi-tubular half spoke sections, placing said sections concavity to concavity with their meeting edges registering, and electrically welding said edges together; (3) electrically butt-welding said spokes to the circumferential periphery of said hub and to the wheel rim.

In testimony whereof I have affixed my signature in presence of two witnesses.

THOMAS E. MURRAY.

Witnesses:
GERTRUDE T. PORTER,
MAY T. MCGARRY.